US006063494A

United States Patent [19]
Schümann et al.

[11] Patent Number: 6,063,494
[45] Date of Patent: May 16, 2000

[54] HEAT-CURABLE PRESSURE-SENSITIVE ADHESIVE FILM

[75] Inventors: Uwe Schümann, Pinneberg; Kirstin Weiland, Hamburg, both of Germany

[73] Assignee: Beiersdorf AG, Hamburg, Germany

[21] Appl. No.: 09/074,228

[22] Filed: May 7, 1998

[30] Foreign Application Priority Data

May 9, 1997 [DE] Germany .................. 197 19 647

[51] Int. Cl.⁷ ...................................... C09J 7/02
[52] U.S. Cl. .................................... 428/354; 428/355 BL
[58] Field of Search ................. 428/354, 355 BL

[56] References Cited

U.S. PATENT DOCUMENTS

| | | | |
|---|---|---|---|
| 3,925,275 | 12/1975 | Musashi | 260/17.4 CI |
| 4,994,508 | 2/1991 | Shiraki | 524/14 |
| 5,098,786 | 3/1992 | Hanke | 428/354 |
| 5,130,185 | 7/1992 | Ness | 428/354 |
| 5,256,738 | 10/1993 | Chasser | 525/330.9 |
| 5,372,865 | 12/1994 | Arakawa | 428/354 |
| 5,466,500 | 11/1995 | Pluim | 428/354 |
| 5,660,922 | 8/1997 | Herridge | 428/354 |
| 5,807,637 | 9/1998 | Schumann | 428/423.1 |

*Primary Examiner*—Jenna Davis
*Attorney, Agent, or Firm*—Norris, McLaughlin & Marcus, P.A.

[57] ABSTRACT

Double-sided pressure-sensitive adhesive film made up of the following components:

| | |
|---|---|
| 15–60% by weight of | a thermally vulcanizable, polyesterified rubber, |
| 10–30% by weight of | bitumen and/or tackifying resins, |
| 1–20% by weight of | vulcanization auxiliaries, |
| 0.2–5% by weight of | vulcanization accelerators, |
| 10–70% by weight of | fillers, and, |
| if desired, further auxiliaries, plasticizers and oils. | |

11 Claims, No Drawings

HEAT-CURABLE PRESSURE-SENSITIVE ADHESIVE FILM

DESCRIPTION

Heat-Curable Pressure-Sensitive Adhesive Film

The invention relates to a rubber-based double-sided pressure-sensitive adhesive film which can be cured thermally in order to achieve high bond strengths.

The use of adhesives in body-shell construction in the automotive industry, as a supplement to the conventional fastening methods such as riveting, screwing or welding, has been prior art for many years. The materials employed are predominantly liquid or pastelike single-component systems which can be conveyed by pumping and applied by machine.

The characteristic requirements on a body-shell adhesive are that:

There must be good, ageing- and hydrolysis-resistant adhesion on oiled metal panels of various kinds, for example on standard steel, hot dip-galvanized steel, galvannealed steel or electrolytically zinc-coated steel, and this adhesion must be reflected in a cohesive fracture pattern. The ageing and hydrolysis stability is tested by storage at elevated temperatures, salt-spray tests, condensation tests, alternating-climate tests and the like.

A body-shell adhesive must not be washed off in the various degreasing baths and showers, in the phosphating and passivating baths, or during electrodeposition coating.

Furthermore, it is required to cure fully in the CED baking oven at about 180° C. within 30 minutes and to be stable to overbaking up to about 230° C.

Although these requirements are met by numerous liquid and paste-like materials, these materials are not devoid of disadvantages. For instance, with many of these adhesives the requirement of wash-off resistance is met only in one of the following ways. Either the liquid or paste-like materials are pregelled in an oven upstream of the washing baths, or the materials are formulated for such high viscosity that they have to be processed as warm-melts or hot-melts; in other words, prior to application they must be heated to a temperature markedly above room temperature. With both methods, the heating operations entail energy costs.

Recent times have also seen market availability of adhesive pastes which can be processed at room temperature and yet in many coating lines are resistant to washing equipment without pregelling, this being achieved by a pronounced pseudoplastic formulation. However, even these adhesives have disadvantages, since before the adhesive is heat-cured the metal parts that are to be bonded have to be fixed mechanically in order to prevent slipping.

In general, all liquid or paste-like, reactive adhesives have the disadvantage that they undergo slow premature crosslinking in the conveying lines and conveying pumps and so very gradually block these lines and pumps, which may lead to breakdowns and production downtime.

Pressure-sensitive adhesive films, on the other hand, do not have these disadvantages. Pressure-sensitive adhesive films which can be cured thermally in order to achieve high strengths are likewise already known.

JP 50 028 970 describes a blend of acrylates and epoxy resin that is prepared from solution, which initially shows pressure-sensitive adhesion and, after thermal curing, achieves high shear strength.

WO 95/13 328, U.S. Pat. No. 5,086,088 and EP 0 386 909 likewise describe heat-curable pressure-sensitive adhesives based on acrylate/epoxy blends, in which the acrylates are crosslinked photochemically.

In addition, JP 04 189 887, JP 04 189 885 and JP 04 189 884 employ special acrylate/epoxy resin blends in order to arrive at heat-curable pressure-sensitive adhesives.

Although there is no doubt that the principle of combining the pressure-adhesive properties of the acrylates and the high strength of the heat-cured epoxides in one system, in the form of blends, works, there are also disadvantages. Using such systems it has not been possible to date to obtain cohesive fracture patterns on oiled automotive body-shell panels at bond strengths of greater than 10 N/mm$^2$. Epoxy resins, moreover, are skin irritants, which in certain circumstances makes it necessary to take special protective measures when such films are applied manually.

DE-A 38 30 895 describes the construction of a rubber from at least two starting polymers, which are linked to one another chemically by way of ester groups and of which at least one is olefinically unsaturated.

EP 0 356 715 B1, finally, describes a two-pack adhesive which likewise utilizes the abovementioned composition and where the mixture is vulcanized at relatively high temperatures. Also set out therein is its use as an automotive body-shell adhesive. However, the application of this material to the substrates that are to be bonded takes place prior to the poly-esterification, and the material is thus able to flow on the substrates.

The object of the invention was to provide a double-sided pressure-sensitive adhesive film which can be cured thermally in order to obtain high bond strengths and which following its thermal curing adheres so well—especially to oiled metal panels as are employed in automotive body-shell construction—that tear tests result in cohesive fracture patterns. In addition, the film should be free from epoxy resins.

This object is achieved by a film as characterized in the main claim. The subclaims are directed towards advantageous embodiments of the film of the invention.

Accordingly, the double-sided pressure-sensitive adhesive film is built up from the following components:

| | |
|---|---|
| 15–60% by weight of | a thermally vulcanizable, polyesterified rubber, |
| 10–30% by weight of | bitumen and/or tackifying resins, |
| 1–20% by weight of | vulcanization auxiliaries, |
| 0.2–5% by weight of | vulcanization accelerators, |
| 10–70% by weight of | fillers, and, |
| if desired, further auxiliaries, plasticizers and oils. | |

The bitumen or the tackifying resins, an example being a terpene phenol resin, serves to adjust the pressure-sensitive adhesion of the film.

The rubber is preferably the reaction product of a polymer or of a polymer mixture A having on average at least two hydroxyl groups per macromolecule and of a polymer or polymer mixture B which is compatible with A and has on average at least two carboxylic acid groups or at least two carboxylic anhydride groups or at least one carboxylic acid group and one carboxylic anhydride group per macromolecule, at least one of these polymers, A or B, comprising olefinic double bonds by means of which the rubber can be vulcanized at elevated temperature under the customary reaction conditions.

In a particularly advantageous embodiment the polymers A and B are liquid polybutadienes which carry on average at least two hydroxyl groups, carboxylic acid groups or carboxylic anhydride groups per macromolecule. These functional groups can be attached terminally, at the chain ends, or on the ends of the side chains, or else can be located at positions within the chain.

Finally, the rubber may comprise, as further starting constituents, short-chain hydroxyl- or carboxylic anhydrideor carboxyl-terminated substances. In terms of the polyester formation, these substances act as terminators (for example monoalcohols), chain extenders (for example glycols) or crosslinkers (for example glycerol).

The rubber is preferably esterified by adding of an esterification catalyst 0.05–0.5%.

Esterification catalysts employed in this context are, in particular, basic esterification catalysts, such as amines, preferably secondary and tertiary aliphatic amines and, with very particular preference, n-dibutylamine, dimethylcyclohexylamine, diazabicyclooctane, tetramethylethylenediamine or pentamethyldiethylenetriamine and also 1-methylimidazole or 1,2-dimethylimidazole. However, it is also possible to employ acidic esterification catalysts provided that no metals are to be bonded. The catalyst must be compatible with the vulcanizing system.

Compounds which have been found particularly advantageous as vulcanizing auxiliaries and vulcanization accelerators are sulphur, 2,2'-dibenzothiazolyl disulphide and, if desired, zinc oxide. These substances are added in the amount customary for vulcanization.

Finally, depending on the specific utility, it is possible for further fillers to be added to the film, such as chalk, carbon black, titanium dioxide, talc, pyrogenic silica, barium sulphate or calcium oxide, and also, as auxiliaries, antioxidants, preferably pentaerythrityl tetrakis[3-(3,5-di-tert-butyl-4-hydroxyphenyl)propionate].

The film may also comprise system-compatible plasticizers or oils which act as plasticizers. Those preferably suitable include customary commercial phthalate plasticizers or naphthenic oils.

The film of the invention is outstandingly suitable for use in automotive body-shell construction, especially for bonding oiled metal panels. However, other metal parts can also be bonded very effectively using the film.

On the basis of its formulation as described above, the film exhibits outstanding product properties which could not have been predicted even by the skilled worker.

Shear strengths of more than 12 MPa can be achieved.

Prior to thermal crosslinking, the film has an adhesive force of from about 1 to 3 N/cm on both oiled and unoiled steel (in each case at a peel angle of 180°). Following thermal curing (at 180° C. and for 30 minutes) a bond strength of up to 14 N/mm² is attained on both oiled and unoiled metal panels. It is also possible to formulate for substantially lower bond strengths in order, for example, to bond underlinings. The bond strength can be controlled by way of the amount of sulphur employed.

Owing to the choice of ingredients the film exhibits good hydrolysis and ageing stability.

It is substantially more skin-friendly than the epoxy films otherwise offered for high-strength bonds, since it includes no significant concentration of substances classified as skin irritants.

The fracture patterns of the films are cohesive in numerous cases. By cohesive fracture patterns are meant those fractures in which adhesive remains on both of the parts which have broken apart.

Again, this is particularly important in the case of automotive metal panels. If the bond between two panels fails it ensures that on each component panel the surface continues to be protected by adhesive, or by the film of the invention. A film which has a cohesive fracture pattern therefore simultaneously takes over the function of corrosion protection; underrusting of the panel is not possible. In addition, a cohesive fracture pattern indicates to the skilled worker that the film exhibits very good adhesion on metal panels in particular.

In connection especially with the proposed use of the film in automotive body-shell construction, this film—owing to the polyester precrosslinking—is not washed off in the various decreasing baths and degreasing showers, in the phosphating and passivating baths, and in the course of electrodeposition coating. In contrast to the two-pack adhesive described in EP 0 356 715, the film is already in a precrosslinked state before being applied to the substrate. Ultimate adhesion to the substrate is obtained by using bitumen and/or tackifying resins to give the film pressure-sensitive adhesion, in the manner of a pressure-sensitive adhesive tape.

To produce the film, first of all either one of the polymers, A or B, or alternatively both polymers, A and B, separately from one another, are admixed with the ingredients indicated, using a customary commercial dissolver, planetary mixer or kneading apparatus with application of reduced pressure. The resulting components A and B are then mixed together using a 2-component mixing unit and then, on a customary coating unit, are spread out on a release paper to form a paste-like film of the desired thickness, preferably from 0.2 to 2.0 mm. In the course of subsequent passage through a heating tunnel, at a temperature which must be well below the onset temperature of the vulcanization and which is otherwise dependent essentially on the nature and amount of the esterification catalyst and on the throughput speed, the paste-like mixture is cured to form the pressure-sensitive adhesive film. At a throughput speed of from 1 to 10 m/min the temperature normally lies between room temperature and 80° C.

EXAMPLES

Table 1 lists the materials used to produce the film, together in each case with the tradename and manufacturer. The chemicals specified are all freely obtainable in commerce. Depending on the intended utility of the film, the starting materials are employed in different proportions.

TABLE 1

Materials used to produce the film, with tradenames and manufacturers

| Tradename | Chemical basis | Manufacturer/Supplier |
|---|---|---|
| Poly bd R 45 HT | Hydroxyl-functionalized polybutadiene | Elf Atochem |
| Polyvest C 70 | Maleic anhydride-functionalized polybutadiene | Hüls |
| Glycerol | Glycerol | Merck |
| Ethylene glycol | Ethylene glycol | Merck |
| Bitumen B 65 | Bitumen | Elf Bitumen Deutschland |
| Schenectady SP 553 | Terpene-phenolic resin | Schenectady |
| Gravex 942 | Naphthenic oil | Shell |
| Palatinol N | Diisononyl phthalate | BASF |
| Crystex N | Sulphur | Kali-Chemie |
| Perkacit MBTS | 2,2'-dibenzothiazolyl disulphide | Akzo Nobel |
| Pulverized high-calcium lime | Calcium oxide | RWK |
| Talkum Prever | Talc | Luzenac |
| Printex 30 | Carbon black | Degussa |
| 1,4-Diazabicyclo[2.2.2]octane (DABCO) | | Merck |
| N,N,N',N'-Tetramethylethylenediamine (TMEDA) | | Merck |

Below, the formulations for producing films of the invention are shown, in each case in the form of a table. The materials used were always prepared in the way described subsequently.

Example 1

| | |
|---|---|
| Poly bd R 45 HT | 26.0 kg |
| Polyvest C 70 | 17.1 kg |
| Bitumen B 65 | 15.0 kg |
| Crystex N | 16.0 kg |
| Perkacit MBTS | 1.5 kg |
| Pulverized high-calcium lime | 3.0 kg |
| Talkum Prever | 15.0 kg |
| Printex 30 | 6.1 kg |
| DABCO | 0.3 kg |

Example 2

| | |
|---|---|
| Poly bd R 45 HT | 28.0 kg |
| Polyvest C 70 | 15.1 kg |
| Bitumen B 65 | 15.0 kg |
| Crystex N | 16.0 kg |
| Perkacit MBTS | 1.5 kg |
| Pulverized high-calcium lime | 3.0 kg |
| Talkum Prever | 15.0 kg |
| Printex 30 | 6.1 kg |
| DABCO | 0.3 kg |

Example 3

| | |
|---|---|
| Poly bd R 45 RT | 26.0 kg |
| Polyvest C 70 | 17.1 kg |
| Bitumen B 65 | 10.0 kg |
| Schenectady SP 553 | 5.0 kg |
| Crystex N | 16.0 kg |
| Perkacit MBTS | 1.5 kg |
| Pulverized high-calcium lime | 3.0 kg |
| Talkum Prever | 15.0 kg |
| Printex 30 | 6.1 kg |
| DABCO | 0.3 kg |

Example 4

| | |
|---|---|
| Poly bd R 45 HT | 26.0 kg |
| Polyvest C 70 | 17.1 kg |
| Bitumen B 65 | 10.0 kg |
| Gravex 942 | 5.0 kg |
| Crystex N | 16.0 kg |
| Perkacit MBTS | 1.5 kg |
| Pulverized high-calcium lime | 3.0 kg |
| Talkum Prever | 15.0 kg |
| Printex 30 | 6.1 kg |
| DABCO | 0.3 kg |

Example 5

| | |
|---|---|
| Poly bd R 45 HT | 26.0 kg |
| Polyvest C 70 | 17.1 kg |
| Bitumen B 65 | 10.0 kg |
| Palatinol N | 5.0 kg |
| Crystex N | 16.0 kg |
| Perkacit MBTS | 1.5 kg |
| Pulverized high-calcium lime | 3.0 kg |
| Talkum Prever | 15.0 kg |
| Printex 30 | 6.1 kg |
| DABCO | 0.3 kg |

Example 6

| | |
|---|---|
| Poly bd R 45 HT | 27.0 kg |
| Polyvest C 70 | 17.0 kg |
| Glycerol | 0.1 kg |
| Bitumen B 65 | 15.0 kg |
| Crystex N | 16.0 kg |
| Perkacit MBTS | 1.5 kg |
| Pulverized high-calcium lime | 3.0 kg |
| Talkum Prever | 15.0 kg |
| Printex 30 | 5.1 kg |
| DABCO | 0.3 kg |

Example 7

| | |
|---|---|
| Poly bd R 45 HT | 27.0 kg |
| Polyvest C 70 | 17.0 kg |
| Ethylene glycol | 0.1 kg |
| Bitumen B 65 | 15.0 kg |
| Crystex N | 16.0 kg |
| Perkacit MBTS | 1.5 kg |
| Pulverized high-calcium lime | 3.0 kg |
| Talkum Prever | 15.0 kg |
| Printex 30 | 5.1 kg |
| DABCO | 0.3 kg |

Example 8

| | |
|---|---|
| Poly bd R 45 HT | 27.5 kg |
| Polyvest C 70 | 18.7 kg |
| Bitumen B 65 | 15.0 kg |
| Crystex N | 13.0 kg |
| Perkacit MBTS | 1.5 kg |
| Pulverized high-calcium lime | 3.0 kg |
| Talkum Prever | 15.0 kg |
| Printex 30 | 6.0 kg |
| DABCO | 0.3 kg |

Example 9

| | |
|---|---|
| Poly bd R 45 HT | 33.5 kg |
| Polyvest C 70 | 22.8 kg |
| Bitumen B 65 | 15.0 kg |
| Crystex N | 4.0 kg |
| Perkacit MBTS | 0.4 kg |
| Pulverized high-calcium lime | 3.0 kg |
| Talkum Prever | 15.0 kg |
| Printex 30 | 6.0 kg |
| DABCO | 0.3 kg |

Example 10

| | |
|---|---|
| Poly bd R 45 HT | 26.0 kg |
| Polyvest C 70 | 17.1 kg |
| Bitumen B 65 | 15.0 kg |
| Crystex N | 16.0 kg |
| Perkacit MBTS | 1.5 kg |
| Pulverized high-calcium lime | 3.0 kg |
| Talkum Prever | 15.0 kg |
| Printex 30 | 6.1 kg |
| TMEDA | 0.3 kg |

The preparation of the A component in these examples was carried out in each case by mixing the stated raw materials, with the exception of Polyvest C70, with one another for two hours in a planetary mixer or dissolver. In order to obtain a bubble-free product the mixture was degassed for the last 10 minutes of the mixing operation, by applying a reduced pressure of less than 15 torr. The result in each case was a paste which can be processed further at room temperature, having a viscosity in the range from 50 to 5000 Pa*s.

The B component in these examples was in each case Polyvest C70.

The A and the B components were mixed together on a 2-component mixing unit and then, in a customary coating unit, the mixture was spread out on double-sided release paper to form a paste-like film 1.0 mm thick. In the course of subsequent passage through the heating tunnel, crosslinking took place at 70° C. to form the pressure-sensitive adhesive film.

The adhesive performance properties found for the films obtained in this way are compiled in Table 2.

The tests were carried out using hot dip-galvanized, electrolytically zinc-plated and galvannealed panels, and also standard steel. The oil (Anticorit RP 4107 S) was applied in a thickness of from 2 to 3 g/m².

| | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|
| prior to thermal crosslinking Adhesive force [N/cm] | | | | | | | | | | |
| Steel (180°, 24 h attachment time) | 1.5 | 2.8 | 1.7 | 1.8 | 1.6 | 1.6 | 1.4 | 1.6 | 1.9 | 1.3 |
| Steel, oiled (180°, 24 h attachment time) | 1.2 | 2.2 | 1.3 | 1.4 | 1.2 | 1.4 | 1.2 | 1.2 | 1.3 | 1.2 |
| after thermal crosslinking (30 min, 180° C.) Bond strength [N/mm²] | | | | | | | | | | |
| Steel | 12.2k | 9.8k | 10.2 k | 13.1k | 10.9k | 12.2k | 11.0k | 8.2k | 1.2k | 10.1k |
| Steel, oiled | 11.8k | 10.3k | 7.5k+a | 11.0k | 9.5k | 13.1k | 12.2k | 7.5k | 1.3k | 12.2k |
| Steel, electrolytically zinc-plated, oiled | 10.5k | 11.2k | 11.2 k | 8.5k | 10.2k | 10.4k | 11.1k | 8.8k | 1.1k | 10.1k |
| Steel, hot dip-galvanized, oiled | 12.3k | 11.0k | 10.4 k | 9.5k | 11.1k | 12.3k | 9.9k | 8.6k | 1.0k | 11.7k |

TABLE 2

| | Adhesive performance properties of the films | | | | | | | | | |
|---|---|---|---|---|---|---|---|---|---|---|
| Steel, hot dip-galvanized, oiled, after overbaking (10 min, 230° C.) | 13.4 k | 11.9k | 8.5k+a | 7.6k+a | 8.8 k | 9.9 k | 8.5k+a | 9.4 k | 1.4 k | 9.7 k |
| Steel, hot dip-galvanized, oiled, after 3 weeks of condensation (DIN 50017-SK) | 9.8k+a | 10.2k | 9.9k+a | 8.1k+a | 6.3k+a | 7.3k+a | 6.5k+a | 6.8k+a | 1.3k+a | 8.5k+a |
| Steel, hot dip-galvanized, oiled, after 6 weeks of storage at 70° C. | 14.2 k | 12.9k | 10.2 k | 12.2 k | 13.2 k | 12.2 k | 12.2 k | 9.4 k | 1.5 k | 11.3 k |

Oil type: Anticorit RP 4107 S
Fracture pattern: c: cohesive
a: adhesive
Application thickness: 2–3 g/m$^2$

What is claimed is:

1. Double-sided pressure-sensitive adhesive film built up from the following components:
   15–60% by weight of a thermally vulcanizable, polyesterified rubber,
   10–30% by weight of bitumen, tackifying resins, or a combination thereof
   1–20% by weight of vulcanization auxiliaries,
   0.2–5% by weight of vulcanization accelerators,
   10–70% by weight of fillers, and
   optionally further auxiliaries, plasticizers and oils wherein said rubber is the reaction product of a polymer or of a polymer mixture A having on average at least two hydroxyl groups per macromolecule and of a polymer or polymer mixture B which is compatible with A and has on average at least two carboxylic acid groups or at least two carboxylic anhydride groups or at least one carboxylic acid group and one carboxylic anhydride group per macromolecule, at least one of said polymers, A or B, comprising olefinic double bonds.

2. Film according to claim 1, wherein the polymers A and B are liquid polybutadienes which carry on average at least two hydroxyl groups, carboxylic acid groups or carboxylic anhydride groups per macromolecule.

3. Film according to claim 1, wherein the rubber comprises, as further starting constituents, short-chain hydroxyl- or carboxylic anhydride- or carboxyl-terminated substances.

4. Film according to claim 1, wherein the rubber is polyesterified by adding 0.05–0.5% by weight of an esterification catalyst.

5. Film according to claim 4, wherein the esterification catalysts employed are amines.

6. Film according to claim 1, wherein the vulcanizing auxiliaries and vulcanization accelerators added are sulphur, 2,2'-dibenzothiazolyl disulphide and, optionally, zinc oxide.

7. Film according to claim 1, wherein the fillers added are selected from the group consisting of chalk, carbon black, titanium dioxide, talc, pyrogenic silica, barium sulphate and calcium oxide.

8. A method for bonding automotive body panels in automotive body-shells, which comprises bonding said body panels with the double-sided pressure-sensitive adhesive film of claim 1.

9. Film according to claim 5, wherein said amines are selected from the group consisting of n-dibutylamine, dimethylcyclohexylamine, diazabicyclooctane, tetramethylethylenediamine, pentamethyidiethylenetriamine, 1-methylimidazole and 1,2-dimethylimidazole.

10. Film according to claim 1, wherein the auxiliaries added are antioxidants.

11. Film according to claim 10, wherein pentaerythrityl tetrakis-[3-(3,5-di-tert-butyl-4-hydroxyphenyl)propionate is added as an antioxidant.

* * * * *